(No Model.)
B. J. QUATTLEBAUM.
Safety Whiffletree.
No. 229,463.            Patented June 29, 1880.
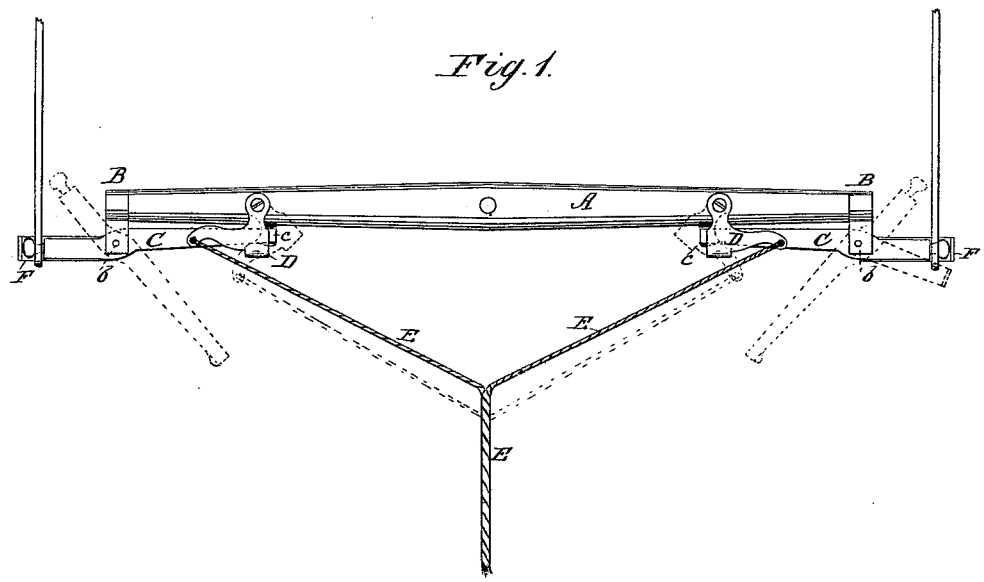
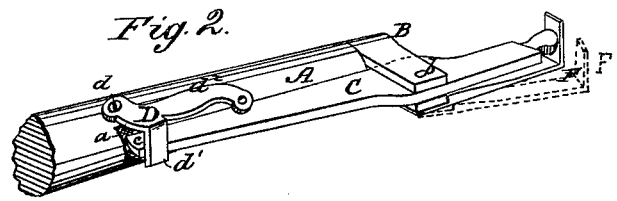
WITNESSES:
W. W. Hollingsworth
John C. Kennow
INVENTOR:
B. J. Quattlebaum
BY
ATTORNEYS.

UNITED STATES PATENT OFFICE.

BOLIVAR J. QUATTLEBAUM, OF RIDGE, SOUTH CAROLINA, ASSIGNOR TO HIMSELF AND JOHN B. DU BOSE, OF SAME PLACE.

SAFETY-WHIFFLETREE.

SPECIFICATION forming part of Letters Patent No. 229,463, dated June 29, 1880.

Application filed April 19, 1880. (No model.)

*To all whom it may concern:*

Be it known that I, BOLIVAR J. QUATTLEBAUM, of Ridge, in the county of Edgefield and State of South Carolina, have invented a new and useful Improvement in Safety-Whiffletrees; and I do hereby declare that the following is a full, clear, and exact description of the same.

The object of my invention is to provide means for releasing horses from vehicles by simple means, that may be instantly and conveniently operated in case of imminent danger, when it is desired to arrest at once the movement of the vehicle and the speed of the horse cannot be checked in time to avert the danger, to be used in disconnecting a vehicle from a runaway horse, and which may be used at any time for conveniently unhitching the horse from the vehicle by timid and unskilled persons, and at the same time provide against the accidental displacement of the trace from the end of the whiffletree, except at such times as the locking mechanism is released, or when the appliances are manipulated by hand to produce the required result.

In the accompanying drawings, Figure 1 is a plan view of a whiffletree, showing the levers and traces in their locked positions in full lines, and the said parts in their released positions, represented by dotted lines. Fig. 2 is a perspective view of one end of a whiffletree provided with the improved connection.

The whiffletree A is of ordinary construction, and attached to the pole or shafts in the usual manner. It should be made somewhat shorter than usual when the form of device herein shown is employed, although this might be partly, if not entirely, obviated by a slight change in the shape and arrangement of parts, the same mechanical means being employed. In the present form, however, the end of the whiffletree is provided with a metal clip, B, having jaws that project from the rear side thereof and receive a lever, C, between them and serve to hold the lever to the end of the whiffletree by a pivot pin or bolt that passes through the lever and ears of the clip. The lever C is pivoted to the clip at about one-third its length, so that the short arm of the lever will project beyond the end of the whiffletree, and the long arm will rest against the rear side thereof and be held firmly and securely in this position by means of a locking-lever, D, of peculiar form. (Shown clearly in Fig. 2.)

The lever D is pivoted to the whiffletree by a screw-bolt, $d$, and is provided with two arms, $d'$ $d^2$. The shorter arm, $d'$, is bent at right angles to the other, $d^2$, so as to hook over the long end of the lever C and hold it against the side of the whiffletree.

In order to form a more secure locking connection between the end of the lever C and the locking-lever D, a rubber strip or button, $a$, is secured to the whiffletree for the end of the lever C to bear against, and a head, $c$, is formed on the end of the lever, so that the hook or short arm $d'$ of the locking-lever will be held by the head and rubber in its locking position.

In order to unhook the end of the lever C from the locking-lever D to release the traces, the ends of the arms $d^2$ $d^2$ of the hook-levers D D are attached to the bifurcated ends of a strap, E, so that both levers may be pulled simultaneously to release the ends of the levers C C at the same moment. The strap E may pass through the dash-board or up through the floor of the vehicle, to be within convenient reach of the occupant or driver. By pulling upon the strap E when the horse is attached and the traces are taut, the effect will be produced as shown by dotted lines in Fig. 1. The levers C will be released from the hooks D D and be drawn around toward the line of draft until the traces will slip off the notched ends $c$ $c$ of the levers and release the horse from its connection with the whiffletree.

In order to prevent the end of the trace from accidentally shifting off the end of the lever C while it is still in its locked position, a plate-metal finger, F, is attached to one of the jaws of the clip B by the pivot-pin $b$, so that it will have a limited vibratory movement, and will, when placed in line with the lever, have its hooked end turned down against the outer end of the lever C and bear against the outer side of the trace. By moving the finger F backwardly a short distance the trace may be removed. The finger F bears against the lever C with a spring-pressure and has a limited vibratory movement only upon the lever, so that it will not become accidentally displaced.

By means of the independently-pivoted finger F the trace may be attached or detached from the end of the whiffletree without working the whole combination of levers. The finger may be used upon the ends of single-trees of the ordinary construction, and may be readily operated without interfering with the other parts of the device. The lever need not be held while the trace is being attached or detached, and the lever need not be fastened down after the trace has been attached.

I claim as my invention and desire to secure by Letters Patent—

A safety attachment for whiffletrees, consisting of the whiffletree A, in combination with the clips B, trace-lever C, pivoted locking-lever D, provided with its branching arms $d'$ $d^2$, to overlap the inner end of the trace-lever, and the finger-plate F, pivoted to the whiffletree, to overlap the outer end of the trace-lever and have a limited vibratory movement to hold the trace upon the end of the lever or release it therefrom, in the manner and for the purpose substantially as described.

BOLIVAR J. QUATTLEBAUM.

In presence of—
M. R. JOHNSON,
P. H. LOUD.